Oct. 19, 1965     W. R. MASH     3,212,409
SINGLE STICK HYDRAULIC CONTROL SYSTEM
Filed Feb. 11, 1963     5 Sheets-Sheet 5

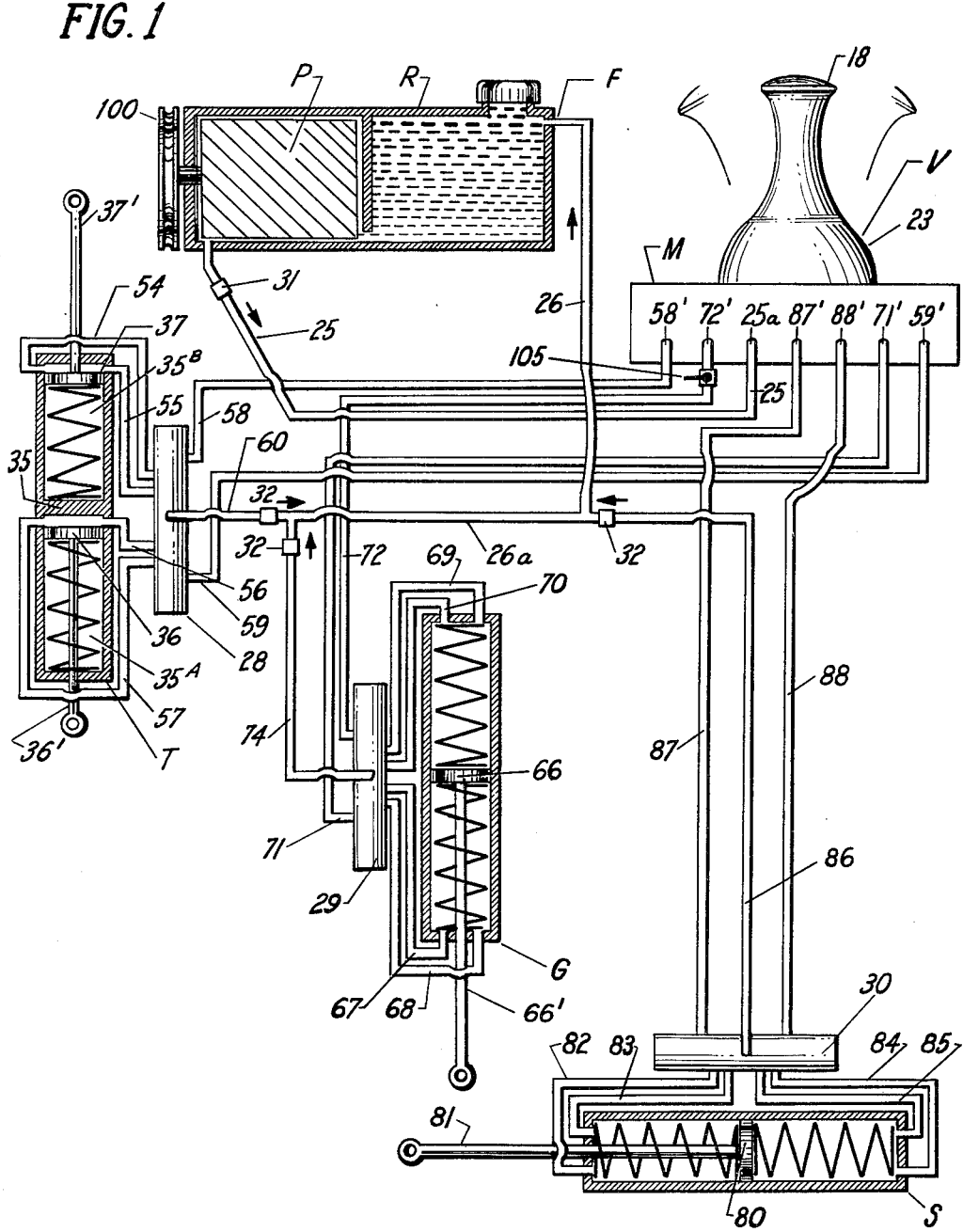

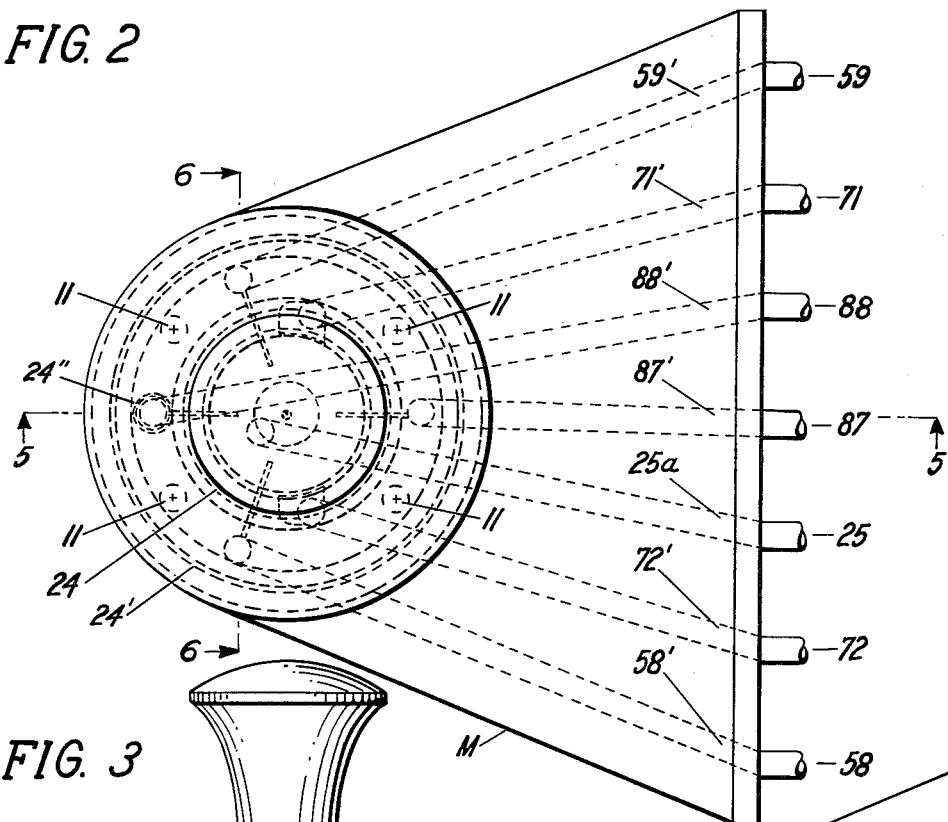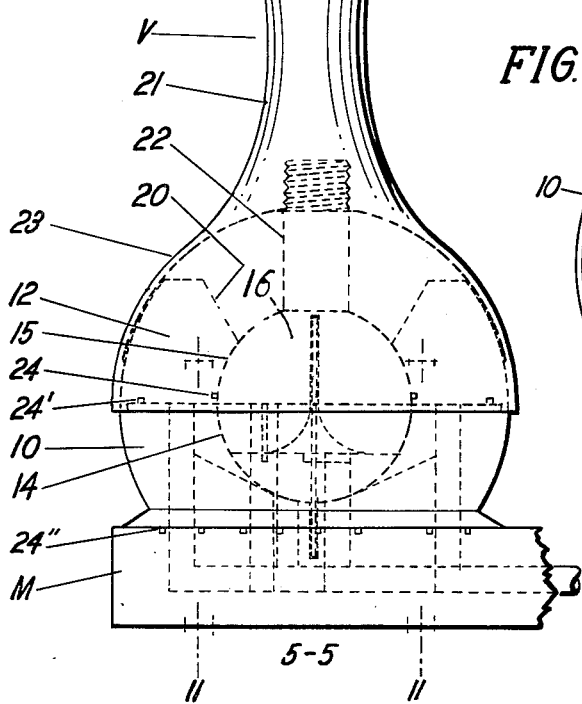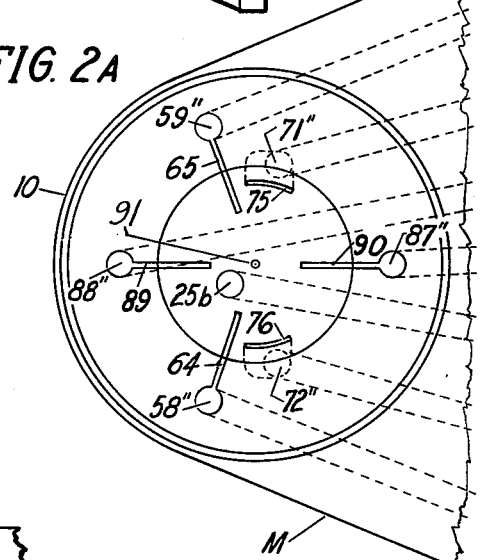

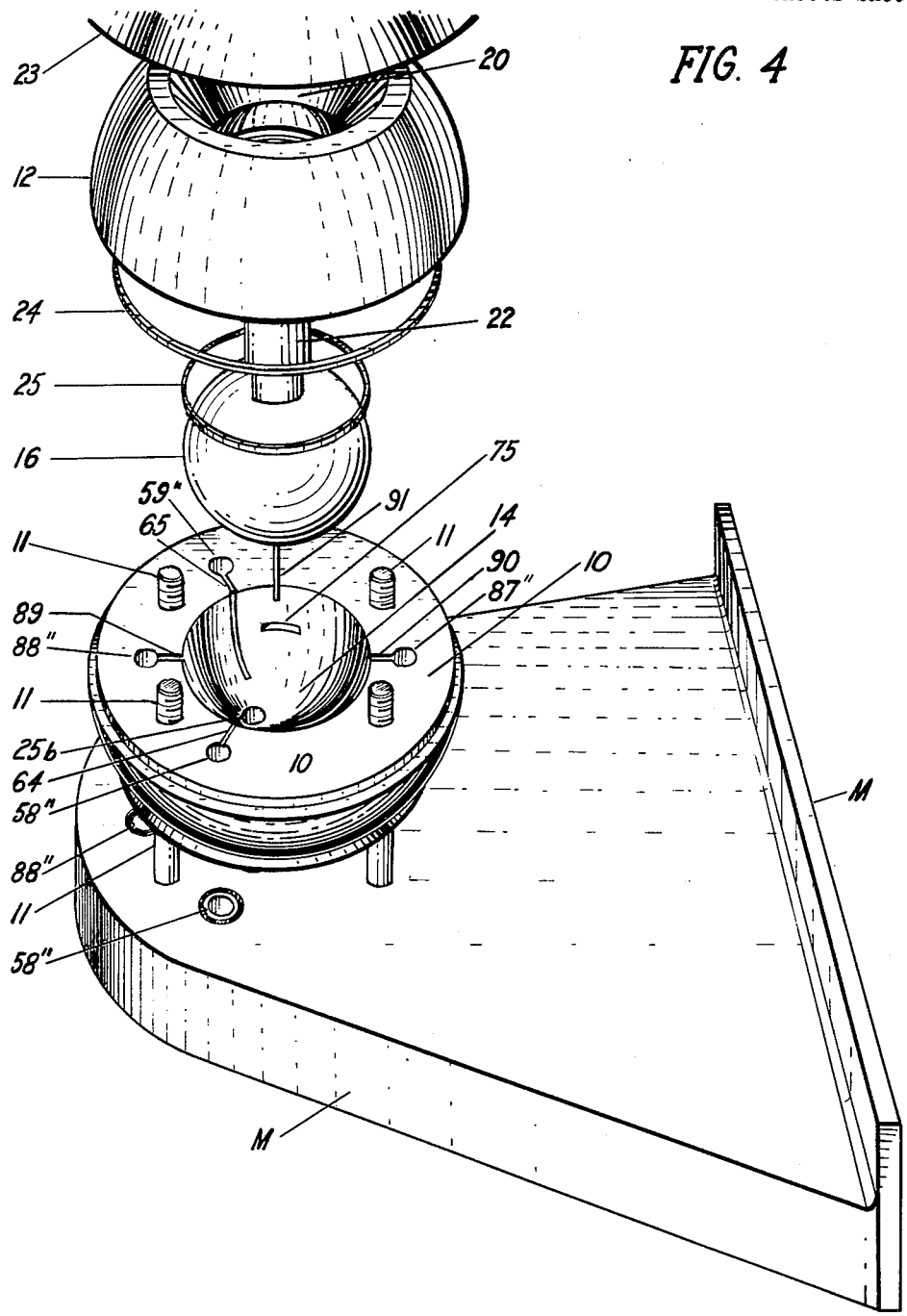

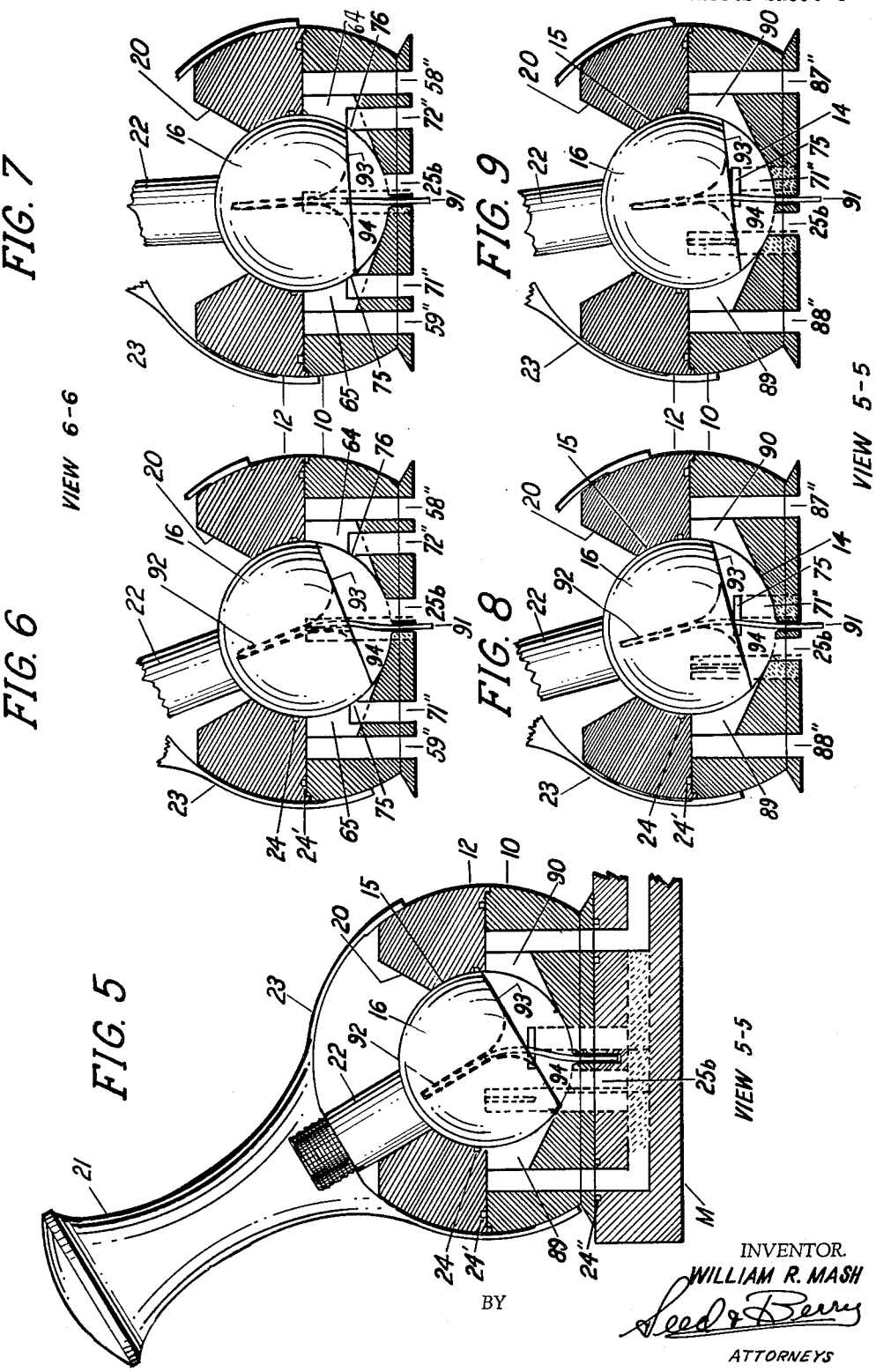

INVENTOR.
WILLIAM R. MASH
BY
ATTORNEYS

United States Patent Office 3,212,409
Patented Oct. 19, 1965

3,212,409
SINGLE STICK HYDRAULIC CONTROL SYSTEM
William R. Mash, 3415 97th SE., Mercer Island, Wash.
Filed Feb. 11, 1963, Ser. No. 257,581
3 Claims. (Cl. 91—461)

This invention relates to what is herein designated as a single stick hydraulic steering and control system. More particularly, it relates to a single stick hydraulic control system that is adaptable for the steering control of such powered vehicles as automobiles, boats, tractors and the like.

It is the principal object of this invention to provide an efficient, practical and safe control system embodying a novel combination of hydraulically actuated double acting power cylinders for effecting the necessary steering and driving operations of a vehicle under positive control of a novel form of six-way hydraulic valve with a "single stick" control member.

It is also an object of this invention to provide an improved control valve especially suited for the constant bleeding and recirculating hydraulic system of this invention.

A further object of the invention is to provide the improved control valve with resilient means for automatically returning it to its neutral position, should its control stick be released by the operator from any open position.

Still further objects and advantages of the invention reside in the details of construction and combination of parts as hereinafter described, particularly in the details of the power cylinder control valves.

In accomplishing the various objects and advantages of the invention as hereinafter described, I have provided the improved details of construction, the preferred forms of which are illustrated in the accompanying drawings, wherein FIG. 1 is a diagrammatic illustration of the present system characterized by the present six-way hydraulic master valve with single control stick; some parts of the hydraulic system being shown in section for explanatory purposes.

FIG. 2 is a top or plan view of the six-way valve with its control stick disposed in its neutral position as mounted for use.

FIG. 2A is a plan view of the base member of the master valve housing.

FIG. 3 is a side view of the master valve and its support, with the valve control stick shown in neutral position.

FIG. 4 is an exploded, perspective view of the valve and valve housing as positioned for its application to and its securement on a supporting manifold that is embodied in the hydraulic system.

FIG. 5 is an enlarged, vertical cross-section of the valve and a portion of the mounting manifold, as seen on line 5—5 in FIG. 2, showing the valve control stick in "full left turn" position.

FIG. 6 is a fragmental cross-sectional view taken on line 6—6 in FIG. 2, showing the stick in a "⅔ forward throttle" position.

FIG. 7 is a view similar to that of FIG. 6 but showing the valve in forward gear driving position.

FIG. 8 is a sectional view showing the valve set in a ½ left turn position.

FIG. 9 is a similar view with stick set for left turn.

Figure 11:
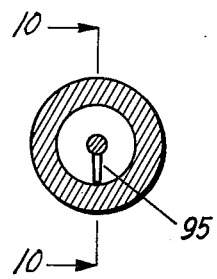
FIG. 11 is a cross-section taken on line 11—11 in FIG. 10, showing a bleeder channel as formed in the end area of a valve body.

Referring more in detail to the drawings:

In FIG. 1, which diagrammatically illustrates the present control system, the six-way hydraulic master valve with its single stick control is designated in its entirety by reference character V; three hydraulic cylinders designed, respectively, for powering the throttle adjusting devices; for shifting the forward and reverse gearing and for actuating the right and left turn controls, are designated by reference characters T, G, and S. The fluid pressure medium F employed in the system for actuation of the three hydraulic cylinders T, G, and S is stored in a closed reservoir R and is adapted to be pumped therefrom into the piping system, under control of the present six-way hydraulic valve V by a power driven pump herein designated by reference character P. It is best shown in FIGS. 2, 3, and 4, that the valve V is mounted on a horizontally supported manifold M that is designed for its rigid securement to a support (not shown) which preferably would be placed at a position of use convenient to the driver or operator of the controlled vehicle.

It will be understood best by reference to FIG. 4, that the valve V embodies a housing comprising a base member 10 that is to be secured upon the top surface of the manifold M by four stud bolts 11. Mounted upon the base member 10 is a complemental top member 12 of annular formation that is secured in its functional position upon member 10 by threading the four bolts 11 upwardly thereinto after passing them upwardly through the manifold M and base member 10.

The base member 10 is formed with a semi-spherical upwardly facing socket or valve seat 14 well shown in FIGS. 3 and 4, that registers with a semi-spherically shaped, downwardly opening valve seat 15 formed in the part 12 as seen in FIG. 5. The two complemental valve seats 14 and 15 together provide a spherically shaped chamber for operatively retaining therein a spherically shaped valve member 16 which is rotatably adjustable to various positions of control by a single handle or stick 21 fixed to and extending upwardly and radially therefrom. It is to be noted by the detailed showing of parts in FIGS. 3 and 5 that the annular top member 12 of the valve housing is formed with an outwardly flared, axial opening 20 through which the stick 22 extends. The stick provides at its upper end, a hand grip portion 21 and at its lower end is threaded to stem 22 that is fixed radially in the valve member 16. The hand grip portion 21 is formed at its lower end with a spherically shaped cup-like shell 23 that is mounted for easy swiveling action on the assembled valve members 10 and 12 in a close fitting joint. Suitable joint sealing gaskets 24 and 24' are applied between the valve members 10, 12 and 16 as shown in FIGS. 5 through 9.

The flared opening 20 in top member 12 provides for the required universal stick movements for hydraulic control in all directions to an angle of approximately thirty degrees from the vertical axial line of the valve, as indicated in FIGS. 5 through 9.

Pipe lines and channels for the conveyance and application of fluid pressure medium under control of valve V to and from the control valves and cylinders are best shown in FIG. 1 to include a pressure line 25 that leads directly from the discharge side of the pressure pump P to the manifold M where it connects with a continuing channel 25a seen in FIG. 2 that leads horizontally in the manifold to a vertical bore 25b, that opens into the base of the valve seat 14 at a point just slightly in back of and to the left of its vertical axial line.

A pressure medium return line 26 leads from the hydraulic system presently to be described to the inlet of reservoir R. This return line 26 has a direct connection at its outer end with a header pipe 26a included in the hydraulic system that has individual connections with three control valves 28, 29 and 30 that are shown in FIG. 1 to be closely associated, respectively, with corresponding power cylinders T, G, and S for their operational control. It has been shown also in FIG. 1, that a constant pressure valve 31 is interposed in the pressure line 25 near its point of connection with the pump P and there are one-way valves 32 interposed in each of the pipe line connections presently disclosed leading between the header 26a and the control valves 28, 29 and 30.

The hydraulic power cylinder T as seen at the left hand side in FIG. 1, is closed at its opposite ends and is divided intermediate its ends by a partitioning wall 35. Reciprocally fitted in the dual cylinders 35A and 35B as thus provided in the lower and upper ends of the cylinder respectively, are pistons 36 and 37 with piston rods 36' and 37' extended therefrom through and beyond the outer end walls of the corresponding cylinders. These piston rods are to be operatively connected with throttle actuating mechanisms, not shown, suitable for forward and reverse driving operations required for the particular vehicle with which this system is used.

Figure 10:
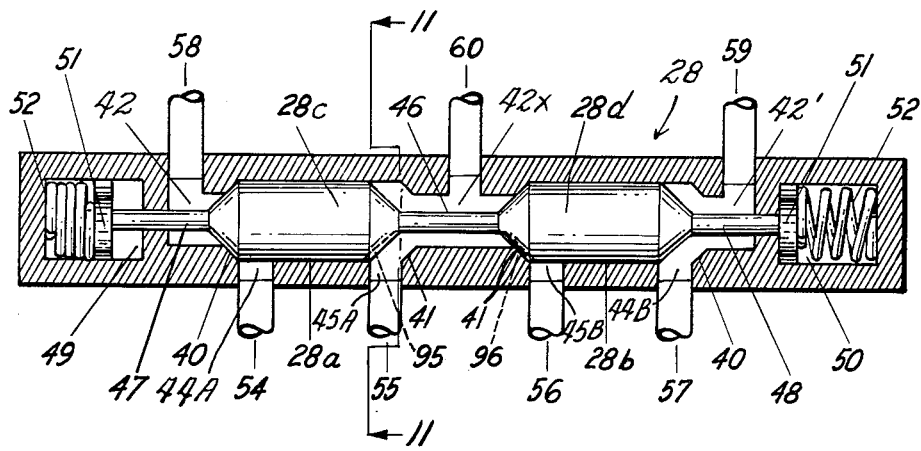
FIG. 10 is an enlarged longitudinal section of one of the controlling valves used in conjunction with a companion hydraulic power cylinder.

In the following description of the valve 28, as shown in FIGS. 10 and 11, it is to be understood that this will apply equally to valves 29 and 30 and the various pipe connections between each valve 28, 29 and 30 and their corresponding power cylinders T, G, and S are all made and serve in the same way.

The control valve 28 that is associated with cylinder T as shown in enlarged section in FIG. 10 comprises a cylindrical housing that is shown to be formed in its medial body portion with two axially aligned cylindrical valve chambers 28a and 28b in which respectively, movable valve bodies 28c and 28d are reciprocally fitted for endwise movement; these valve bodies being joined together in fixed relationship by a connecting rod or neck 39 for their movement in unison, each valve having conical opposite end surfaces designed to close against conical valve seats 40 and 41, at the opposite ends of their respective chambers, 28a and 28b.

The valve chambers 28a and 28b, respectively, have inlets 42 and 42' at their outer ends, opening to the top side of the valve housing as seen in FIG. 10, and an outlet 42x opening upwardly from a passage 44 of reduced diameter that joins the inner ends of the two valve chambers. Also, the two chambers 28a and 28b at that side of the housing, opposite the ports 42, 42' and 42x have ports designated at 44A–45A and 44B–45B opening into their opposite ends. The two movable valve bodies 28c and 28d have piston rods 47 and 48 extended from their outer ends into cylinders 49 and 50 formed in the opposite ends of the valve housing, each equipped with a piston head 51. These heads act against balanced coil springs 52—52 contained in the outer ends of their respective cylinders 49 and 50 which will be alternately compressed with the reciprocal actuation of the connected valves 28c and 28d.

It is to be observed that the two ports or passages 44A–45A opening from valve chamber 28a in FIG. 10 are shown in FIG. 1 to have pipe line connections 54–55 with the outer end of the cylinder, chamber 35B and likewise, the two ports 44B–45B have pipe connections 57–56 with the inner end of cylinder chamber 35a. Also, it is to be noted that the ports 42 and 42' of valve chambers 28a and 28b have pipe line connections 58, and 59 that lead to the manifold M and there connect respectively with channels 58' and 59' formed therein while the medial passage 44 has a pipe line connection 60 with the adjacent end of the header pipe 26a, which conducts pressure medium back to return line 26 leading to reservoir R. Manifold channel 58', as seen in FIG. 2 leads through a port 58" that opens upwardly into valve seat 14 as a radial slit 64 as shown best in FIGS. 2 and 2A. Likewise, manifold channel 59' leads into the base 10 of valve V and opens upwardly into the valve seat 14 through a vertical port 59" and radial slit 65.

Hydraulic cylinder G, as shown in FIG. 1 is closed at its ends and reciprocally contains a piston 66 equipped with an extended piston rod 66' that will have operating connections for actuation of devices that operate to shift the vehicle's driving devices in or out of driving gear. Pipe lines 67 and 68 lead from the lower end of this cylinder and connect with ports 44A and 45A of valve 29. Likewise, pipe lines 69 and 70 lead from its upper end to the ports 44B–45B of valve 29.

It is to be here explained that the control valves 29 and 30 are of the same general construction as valve 28 shown in longitudinal section in FIG. 10 and have the same arrangement of ports and passages as described in connection with valve 28. Thus, in joining of pipe lines 67 and 68 that lead from cylinder G, with valve 29, they would lead into a valve chamber corresponding to chamber 28a in FIG. 11 while pipe lines 69 and 70 would lead into a valve chamber corresponding to chamber 28b. The two outer end ports 42–42' at the other side of valve housing 29, connect through pipe lines 71 and 72, respectively, with manifold channels 71' and 72' as noted in FIGS. 2 and 2A, while the medial passage 44 is connected through port 42x with the header pipe line 26a by a pipe line 74.

The manifold channels 71' and 72' open into opposite sides of seat 14 of valve V as horizontal slits 75 and 76 which are shown in FIGS. 5, 6, 7, 8, and 9 to be at the same horizontal level.

In this specification, I will hereinafter refer to the outlet passage slits 64 and 65 as "paired companion" outlets as also are the two paired outlet slits 89 and 90 and the two horizontal slits 75 and 76.

Before giving an explanation of the mode of operation of the system, it will be pointed out, for better understanding, that the fluid pressured medium M would fill the entire system of cylinders, valves and pipe lines, but it has not been shown in the various valves and cylinders in order to avoid confusion in the illustrations.

With the various valves, cylinders and pressure lines so constructed and joined, operation of the system, as for controlling the driving operations of a vehicle such as an automobile would be as follows:

First, the pump P is set in operation through any suitable driving connection with the vehicle engine, for example, by driving the belt wheel 100 seen in FIG. 1. The pump P operates to effect delivery of the fluid pressure medium through pipe line 25 to valve V for its application to any of the selected valves 28, 29 or 30 for controlled application therethrough to their corresponding power cylinders T, G, and S. The stick 18 will ordinarily be set in its neutral position as in FIG. 1. The first operation is to adjust the power mechanism into driving gear through the application of fluid pressure medium to power cylinder G which in FIG. 1 shows the piston 66 in neutral position.

When the valve stick 18 is moved from its neutral position to a limited forward leaning position, as for example, to the position in which it is shown in FIG. 7, the valve member 16 will close off the horizontal slit-like port 75 of the valve seat 14 thus, as herein shown, to divert liquid from the valve passage 94 through the uncovered slit 76 and pipe line 72 to the valve 29 of FIG. 1 and this pressure medium will be applied through that valve to actuate the piston 66 of cylinder G and its rod 66' downwardly thus to put the vehicle transmission in "driving gear." With the vehicle in driving gear, the stick may be moved forwardly or rearwardly, depending on the direction of travel desired to more or less extent from the slightly forward to full forward position for throttle control and likewise, the same stick movements may be made in the rearward direction for traveling rearward. If the stick adjustments are made for travel forward, it places the valve member 16 in a position that permits flow of the pressure medium from pressure pipe line 25b through valve passage 94 and thence through valve seat slit 64 of FIGS. 2 and 2A to pipe lines 58, to valve 28 to so move its valve bodies 28d and 28c as to deliver the pressure medium against piston 37 of cylinder T for forward throttle adjustment and acceleration, which will be in accordance with the extent of advancement of the stick. If a turn is to be made from starting position, the stick 18 will be leaned to one side or the other, depending on the direction of the turn and sharpness desired. Moving forwardly or rearwardly as it is leaned laterally will actuate throttle as well as a turn. The act of turning to one side or the other is accomplished as follows:

For making a right or left turn of the traveling vehicle, the stick 18 is leaned to one side or the other, as in FIGS. 5, 8 or 9, to more or less extent depending on the sharpness of turn desired. This stick movement diverts pressure medium from passage 94 through slit passages 89 or 90 through pipes 88″ or 87″ (FIGS. 2 and 2A) to valve 30 to effect its application to cylinder S wherein it acts on piston 80 and rod 81 to effect right or left steering control.

It is to be noted in FIG. 1 that the pistons 66 and 80 of cylinders G and S are acted on by balanced coiled springs 102 for their return to neutral positions when oil pressure is lost, because of leak or pump failure. In the throttle control cylinder T, individual coil springs 103–103′ act to return the pistons 36 and 37 to idle positions when oil pressure is lost because of leak or pump failure.

It should be noted that the hydraulic control system which is used in this case is not a sealed system in the general meaning. It is more of what I call, a constant bleed and recirculating system.

In order to have a control which is a gradual increasing or a gradual decreasing in pressure which is under the direct control of the main stick control valve, I found it necessary to design my system around this constant bleeding continuous recirculating idea.

It should be noted by the showing in FIGS. 10 and 11, that radially directed grooves 95 and 96 are formed respectively in the inner conical end areas of the valve bodies 28c and 28d. By provision of these grooves, it is evident that there never is a complete sealing off of the flow of pressure medium in the system at any time.

The flow of fluid as controlled by the sliding valve of FIGS. 10 and 11 will effect the parts in this way:

Upon entrance of fluid from pipe 59 into passage 42′ it will act against the conical end of valve body 28d, forcing it to slide laterally to the left. This action will allow the fluid to exit from passage 44B through pipe 57 which leads to the upper end of chamber 35A of cylinder T.

While port 44B is open, port 45B is closed except for the bleeding of the pressure medium past the valve seat 41 through the end groove 96 in valve body 28d, into passage 44 and out through port 42x and pipe 60. Likewise, when pressure medium is supplied through pipe line 58 to close valve body 28c against its valve seat 41, outflow is through pipe 54 to the outer end of chamber 35B and the bleeding is through channel 95 to passage 44 and out through pipe 60 to return line 26.

If the oil pressure is greater in pipe 58 than in pipe 59 there will be a reverse action of the sliding valve bodies. The control of this pressure is accomplished through the manipulation of the control valve 18 in FIG. 1.

Extending from the outer ends of valve parts 28c and 28d are rods 47 and 48 equipped at their outer ends with pistons 51—51 which are contained in piston chambers 49 and 50 to act against coil springs 52—52 confined in the chambers to serve as a neutralizing mechanism when oil pressure is lost or a break in an oil line develops. Also the springs will bring the system to neutral when the engine is shut off. The function of the six springs in cylinders T, G, and S of FIG. 1 is meant for the same purpose.

It is to be understood, as previously noted at line 25 et seq. in column 1, that if at any time should the control valve 18 in FIG. 1 be released from the hand of the driver or operator, the stick will automatically return to its neutral position. This will have an effect as follows. If the vehicle is traveling in any direction forward, backward or in a turn; at the instant of release, this vehicle will cut its throttle, jump out of the drive gear and the steering will return to a straight line position. All this is possible because of a cylindrical shaped pin of spring steel which is identified as a part 91. It should be noted here that pin 91 fits into part 16 by its placement within a passage 92 which has been drilled into part 16 slightly larger than the diameter of pin 91, so that it will slip freely without binding.

Another feature of the system resides in the provision of a manually operable shut-off valve 105 in the pipe line 72 for the purpose of holding the system against the placing of the transmission in driving gear; this holding being desirable when the engine is being warmed up prior to shifting the clutch into driving gear. With this valve closed, it is impossible to shift the valve 29 to deliver medium to cylinder G to place the vehicle engine in gear.

I claim:

1. A master hydraulic control valve for a double acting power cylinder; said valve comprising a housing enclosing a spherical chamber, a ball-like valve member pivotally fitted in said chamber and having a segmental portion removed from one side thereof thus to provide a fluid passage within the chamber; said housing having an inlet port for a fluid pressure medium entering said chamber at a point that maintains full and direct communication with said passage for all positions of valve adjustment and having companion fluid outlet passages leading from opposite sides of the spherical chamber and adapted for communication respectively with opposite ends of a double acting cylinder for its control by application of said pressure medium thereto, and a handle means extended from said ball-like valve member for its adjustment from a neutral position, at which both of said fluid outlets are slightly uncovered to receive pressure medium from said fluid passage to a tilted position whereby one outlet is progressively opened and the other progressively closed for a predetermined and controlled action of the power cylinder, and a resilient spring rod, fixed at one end in said valve housing with its opposite end portion confined in said ball like valve member; said rod being yieldable for valve adjustment, under control of said handle means, and to yieldingly return and retain said valve member in its neutral position when uncontrolled by said handle means.

2. A master hydraulic control valve for a plurality of double acting power cylinders; said valve comprising a housing formed with a spherical chamber, a ball like valve member fitted for pivotal adjustment in said chamber and having a segmental portion removed from its bottom surface, providing a fluid passage with a flat top surface across the valve; said housing having an inlet port for a hydraulic pressure medium which is positioned to maintain communication with said valve passage for all positions of valve adjustment, and having a plurality of companion outlets at opposite sides of the valve chamber and in angular spacing thereabout whereby each pair, by tilting adjustment of the valve, may be positioned to receive pressure medium from the valve passage in varying regulated amounts in accordance with valve tilting, a handle extended upwardly from the valve and housing for valve adjustments, a resilient spring rod with one end portion mounted in said housing and extended radially into the valve member to yieldingly urge it from any position of set adjustment to a neutral position upon release of said handle.

3. A hydraulic control system comprising, in combination, a double acting power cylinder, a companion controlling valve for said power cylinder, a source of supply of fluid pressure medium, and a master valve for the application of the fluid pressure medium from said source of supply to said power cylinder; said master valve comprising a housing formed with a spherical chamber, a ball shaped valve member with a segment removed therefrom pivotally fitted in said housing chamber and coacting with the housing to provide a fluid passage across the base of said spherical chamber and a supply line from said source of supply of pressure medium leading into said passage; said companion controlling valve for said power cylinder comprising a housing containing paired coaxial cylinders, each with valve seats at its opposite ends, valve bodies fitted for reciprocal movement in said paired cylinders and joined for action in unison from and against the opposite end seats of their respective cylinders, pressure medium delivery lines leading from the opposite sides of the master valve housing and fluid passage therein respectively, into said control valve cylinders through their outer end seats, a pressure medium return line leading from the inner end seats of both cylinders of said controlling valve to the source of supply of pressure medium, dual pressure medium delivery lines leading from each cylinder of said control valve from points immediately within its opposite end seats; those lines from one cylinder leading into one end of the power cylinder and those leading from the other cylinder leading into the opposite end of the power cylinder; said valve bodies, in their unitary reciprocal action, causing the alternate closing and opening of the two delivery lines that each valve body controls; each of said valve bodies being formed radially of its inner end seating portion with a channel for a bleeding flow of pressure medium past the seat to the pressure medium return line from said companion valve housing.

References Cited by the Examiner

UNITED STATES PATENTS

| | | | |
|---|---|---|---|
| 844,090 | 2/07 | Bijur | 91—431 |
| 969,181 | 9/10 | McGee | 91—464 |
| 2,270,943 | 1/42 | Freundel | 91—412 |
| 2,401,258 | 5/46 | Livers | 91—413 |
| 2,505,527 | 4/50 | Court | 91—420 |
| 2,588,520 | 3/52 | Halgren et al. | 91—420 |
| 2,592,062 | 4/52 | Perry | 251—315 X |
| 2,637,341 | 5/53 | Borst | 91—464 |
| 2,641,280 | 6/53 | Fleischhauer | 137—625 |
| 2,644,310 | 7/53 | Detrez | 91—413 |
| 2,861,593 | 11/58 | Bowman | 91—413 |
| 2,964,060 | 12/60 | Sargent. | |
| 2,985,191 | 5/61 | Beckett | 137—625.2 |
| 3,008,456 | 11/61 | McCoy | 91—413 |
| 3,071,155 | 1/63 | Danley | 137—625 |

FRED E. ENGELTHALER, *Primary Examiner.*

SAMUEL LEVINE, *Examiner.*